United States Patent [19]

Kim

[11] Patent Number: 5,003,261

[45] Date of Patent: Mar. 26, 1991

[54] ROTATION DETECTION CIRCUIT HAVING INPUT PULSE SIGNALS FOR A STEP MOTOR

[75] Inventor: Jeong Y. Kim, Seoul, Rep. of Korea

[73] Assignee: Goldstar Co., Ltd., Seoul, Rep. of Korea

[21] Appl. No.: 409,967

[22] Filed: Sep. 18, 1989

Related U.S. Application Data

[63] Continuation of Ser. No. 290,041, Dec. 23, 1988, abandoned.

[30] Foreign Application Priority Data

Dec. 23, 1987 [KR] Rep. of Korea .............. 14832/1987

[51] Int. Cl.$^5$ .................. G01B 7/14; G01R 33/00; H02P 8/00
[52] U.S. Cl. ................ 324/207.25; 324/262; 318/696
[58] Field of Search ............... 324/207, 208, 226, 262; 364/167.01, 174, 565, 474.12; 318/685, 696

[56] References Cited

U.S. PATENT DOCUMENTS

| | | | |
|---|---|---|---|
| 3,465,217 | 9/1969 | Kress | 318/685 |
| 4,520,302 | 5/1965 | Hill et al. | 318/685 |
| 4,691,153 | 9/1967 | Nishimura | 318/696 |

Primary Examiner—Walter E. Snow
Attorney, Agent, or Firm—Rosen, Dainow and Jacobs

[57] ABSTRACT

A rotation angle detection circuit for a step motor providing an up/down control signal for determining positive and negative rotation of the step motor and a mask control signal for determining rotation angle of 15° and 30°. The circuit can correctly detect the rotation angle of the step motor by counting the pulse signals from the up/down control signal and mask control signal. It is thereby useful for application in a system which electrically measures the rotation of the step motor.

3 Claims, 3 Drawing Sheets

FIG, 5

1: HIGH
0: LOW

| C₂ | B₂ | A₂ | C₁ | B₁ | A₁ | UP/DO | MS |
|---|---|---|---|---|---|---|---|
| 0 | 0 | 1 | 0 | 1 | 1 | 0 | 1 |
| 0 | 0 | 1 | 0 | 1 | 0 | 0 | 0 |
| 0 | 0 | 1 | 1 | 0 | 1 | 1 | 1 |
| 0 | 0 | 1 | 1 | 0 | 0 | 1 | 0 |
| 0 | 1 | 1 | 0 | 1 | 0 | 0 | 1 |
| 0 | 1 | 1 | 1 | 1 | 0 | 0 | 0 |
| 0 | 1 | 1 | 0 | 0 | 1 | 1 | 1 |
| 0 | 1 | 1 | 1 | 0 | 1 | 1 | 0 |
| 0 | 1 | 0 | 1 | 1 | 0 | 0 | 1 |
| 0 | 1 | 0 | 1 | 0 | 0 | 0 | 0 |
| 0 | 1 | 0 | 0 | 1 | 1 | 1 | 1 |
| 0 | 1 | 0 | 0 | 0 | 1 | 1 | 0 |
| 1 | 1 | 0 | 1 | 0 | 0 | 0 | 1 |
| 1 | 1 | 0 | 1 | 0 | 1 | 0 | 0 |
| 1 | 1 | 0 | 0 | 1 | 0 | 1 | 1 |
| 1 | 1 | 0 | 0 | 1 | 1 | 1 | 0 |
| 1 | 0 | 0 | 1 | 0 | 1 | 0 | 1 |
| 1 | 0 | 0 | 0 | 0 | 1 | 0 | 0 |
| 1 | 0 | 0 | 1 | 1 | 0 | 1 | 1 |
| 1 | 0 | 0 | 0 | 1 | 0 | 1 | 0 |
| 1 | 0 | 1 | 0 | 0 | 1 | 0 | 1 |
| 1 | 0 | 1 | 0 | 1 | 1 | 0 | 0 |
| 1 | 0 | 1 | 1 | 0 | 0 | 1 | 1 |
| 1 | 0 | 1 | 1 | 1 | 0 | 1 | 0 |
| OTHERS | | | | | | 0 | 0 |

5,003,261

ROTATION DETECTION CIRCUIT HAVING INPUT PULSE SIGNALS FOR A STEP MOTOR

This application is a continuation, of application Ser. No. 290,041, filed Dec. 23, 1988, now abandoned.

BACKGROUND OF THE INVENTION

The present invention relates to a rotation angle detection circuit for a step motor which is able to correctly detect the rotation angle of a rotary shaft of a step motor.

In general, a step motor is driven in an open loop type without a feedback because its control characteristic is extraordinarily good.

FIG. 1 is a control block diagram of a conventional step motor. As shown in the drawing, when a control signal is input to a drive unit 1, the drive unit 1 applies a predetermined pulse signal to a number of input terminals of a step motor 2. As a rotary shaft of the step motor 2 is rotated a required angle. However, in such a conventional step motor, there is no device for determining whether the rotary shaft of the step motor 2 is rotated as much as required.

This is explained in more detail with reference to the equivalent circuit of FIG. 2 in which a step motor provided with three input terminals A, B, C is illustrated as an example. As shown in the drawing, coils L1, L2; L3, L4; L5, L6 are connected in series to the input terminals A, B, C, with a predetermined angle kept.

In such a step motor, when power is applied selectively to the input terminals A, B, C by the selection of switches S1, S2, S3, a magnetic field is generated at the coils L1-L2; L3, L4; L5, L6 in response to the input terminals S1, S2, S3 to which the power is input. Thus a permanent magnet of a rotator is then rotated a short distance so as to be balanced with the generated magnetic field.

FIG. 3 is a diagram showing the rotation angle of the above-mentioned step motor. For example, under the state of "001" power is applied only to an input terminal A; when power is also applied to an input terminal B, the state changes to 011 and, a rotary shaft is rotated at an angle of +15°, and in this state 011 when power is applied only to the input terminal B, the state changes to "010", the rotary shaft is rotated at an angle of +15°.

As above, the rotator of the step motor is rotated at an angle of ±15° or ±30° in accordance with a state and power that is applied to the input terminals A, B, C of the step motor or is to be applied thereto.

However, in such a conventional step motor, since the rotation of the step motor is controlled in an open loop manner, it is difficult to determine how much the rotary shaft of the step motor is rotated, and thus there is a disadvantage in that it is impossible to use the step motor in a system which needs a position signal of the rotary shaft of the step motor.

SUMMARY OF THE INVENTION

Therefore, the object of the present invention is to provide a rotation angle detection circuit for a step motor which is able to correctly detect and provides an output which is a function of the rotation angle of a step motor when the step motor is rotated by a control signal.

The above object is attained by; obtaining a pulse signal when a control signal for driving a step motor is generated; generating an up/down direction control signal for determining the positive and negative rotation of the step motor in response to the state of a control signal of the step motor and a mask control signal for determine the rotation angles of 15°, 30°; and then counting the pulse signals from said up/down control signal and mask control signal.

BRIEF DESCRIPTION OF THE DRAWINGS

The above and other objects, features and advantages of the present invention will become apparent from the following detailed description taken in conjunction with the accompanying drawings, in which:

FIG. 5 is a truth table of a programmable array logic circuit of FIG. 4.

DETAILED DESCRIPTION OF THE INVENTION

Figure 1:
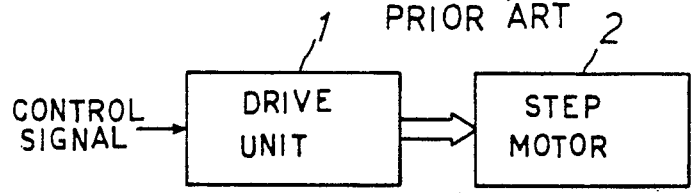
FIG. 1 is a control block diagram of a conventional step motor.
Figure 2:
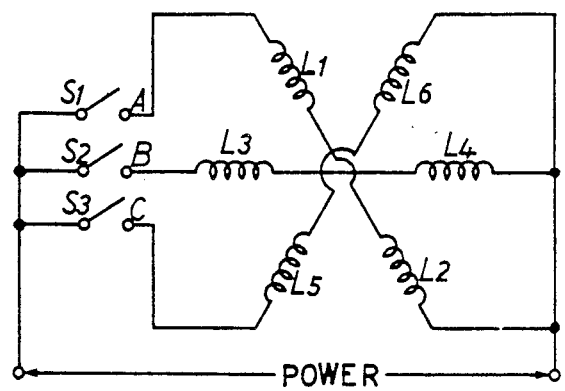
FIG. 2 is an equivalent circuit diagram of the conventional step motor of FIG. 1.
Figure 3:
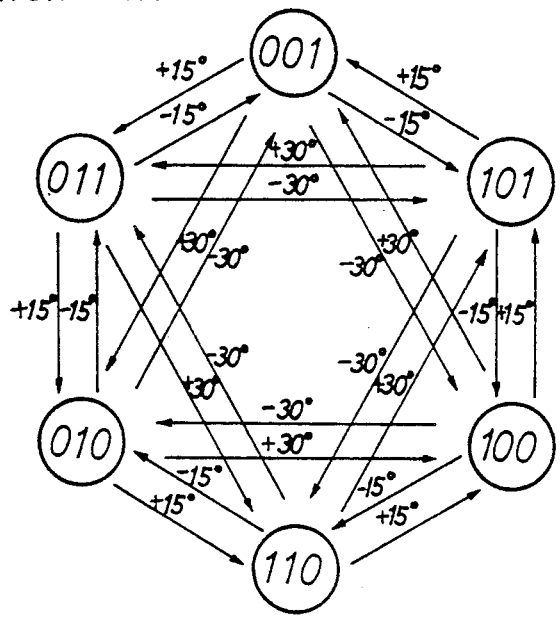
FIG. 3 is a table illustrating the rotation angles according to an input control signal of the conventional step motor.
Figure 4:
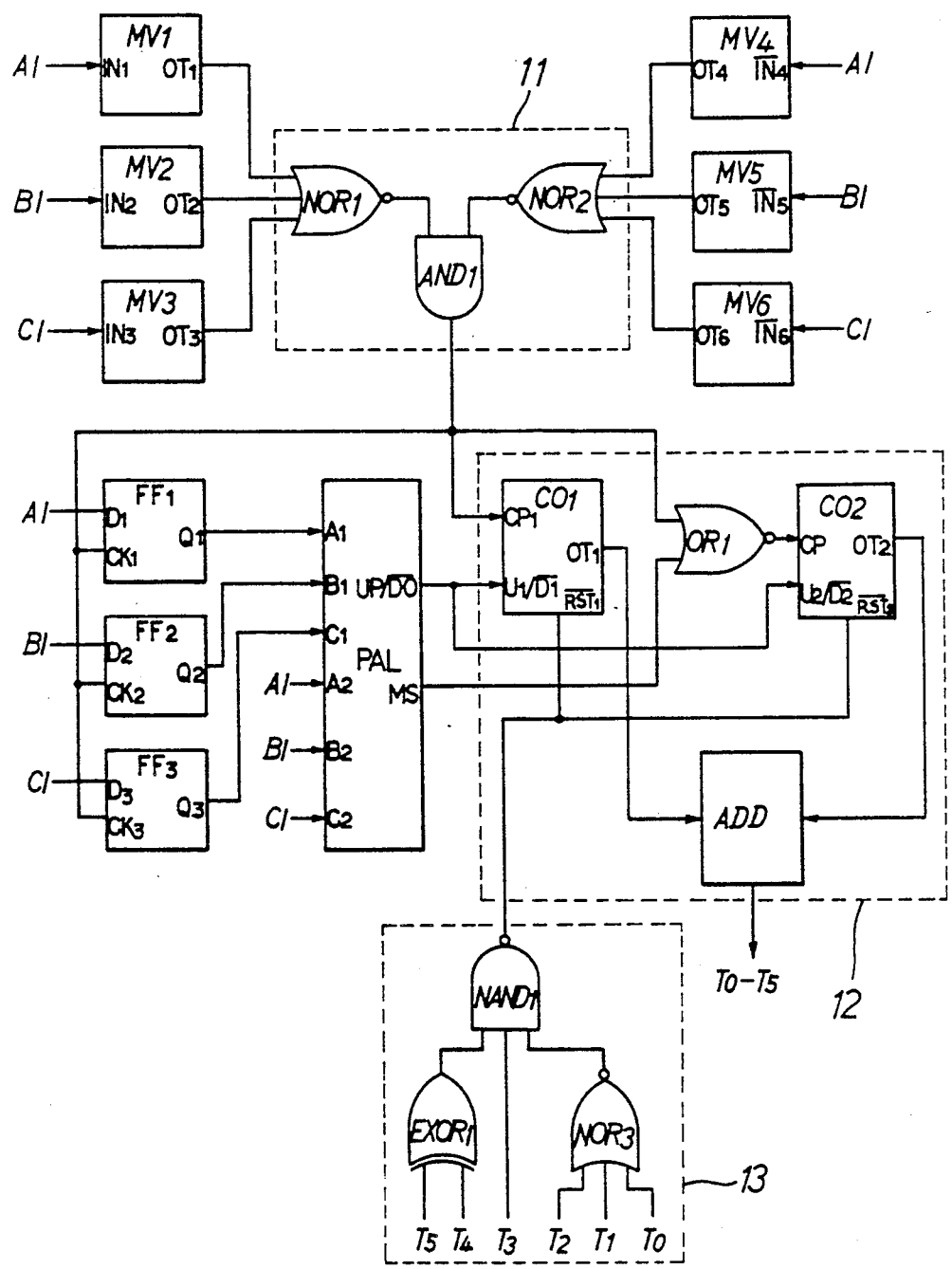
FIG. 4 is a rotation angle detection circuit for a step motor according to the present invention.

Referring to FIG. 4, there is shown a rotation angle detection circuit for a step motor according to the present invention, which comprises monostable multivibrators MV1-MV3 which output pulse signals (edge signals) at a leading edge of input pulse signals being inputted to terminals AI, BI, CI, monostable multivibrators MV4-MV6 which output pulse signals (edge signals) at a trailing edge of the input pulse signals being to the input terminals AI, BI, CI, a signal combinational circuit 11 comprised of NOR gates NOR1, NOR2 and an AND gate AND1, which output one low potential pulse signal in response to the output pulse signals from one of the monostable multivibrator MV1-MV6, flip-flops FF1-FF3 (a switch control means) which output the signals of the input terminals AI, BI, CI in response to the output signal of said signal combinational circuit 11, a programmable array logic circuit PAL which outputs an up/down direction control signal UP/$\overline{D0}$ and a mask control signal MS in response to the output signals of the flip-flops FF1-FF3 and the signals of the input terminals AI, BI, CI, a counting circuit 12 comprised of counters CO1, CO2, an OR gate OR1 and an adder ADD, which outputs rotation angle signals T0-T5 by counting the output signals of the signal combinational circuit 11 in response to the output signals of said programmable array logic circuit PAL, and a reset circuit 13 comprised of a NOR gate NOR3, an exclusive OR gate EXOR1 and a NAND gate NAND1, which resets the counters CO1, CO2 of the counting circuit 12 in response to the output signal of the counting circuit 12.

In the above construction, at the input terminals AI, BI, CI, the signal being input to a step motor is converted into a TTL (Transistor-Transistor Logic Circuit) level and then input thereto. That is to say, at the input terminals AI, BI, CI, the voltages of zero volts and 5 volts are input, and the programmable array logic circuit PAL outputs an up/down direction control signal UP/$\overline{D0}$ and a mask control signal MS in response to the signals being input to input terminals A1, B1, C1, A2, B2, C2, as shown in the truth table of FIG. 5 and the following logical expression.

$UP/\overline{D0} = \overline{C2}.\overline{B2}.A2.C1.\overline{B1} + \overline{C2}.B2.A2.\overline{B1}.A1 + \overline{C2}.B2\overline{A2}.\overline{C1}.A1 + C2.B2.\overline{A2}.\overline{C1}.B1 + C2.\overline{B2}.\overline{A2}.B1.A1 + C2.\overline{B2}.A2.C1.\overline{A1}$ $MS = \overline{C2}.\overline{B2}.A2.\overline{C1}.B1.A1 + \overline{C2}.\overline{B2}.A2.C1.\overline{B1}.A1 + \overline{C2}.B2.A2.\overline{C1}.B1.\overline{A1} + \overline{C2}.B2.A2.\overline{C1}.\overline{B1}.A1 + \overline{C2}.B2.\overline{A2}.C1.B1.\overline{A1} + \overline{C2}.B2.\overline{A2}.\overline{C1}.B.1.A1 + C2.B2.\overline{A2}.C1.\overline{B1}.\overline{A1} + C2.\overline{B2}.\overline{A2}.C1.B1.\overline{A1} + C2.\overline{B2}.\overline{A2}.C1.\overline{B1}.A1 + C2.\overline{B2}.A2.\overline{C1}.\overline{B1}.A1 + C2.\overline{B2}.A2.C1.\overline{B1}.\overline{A1}$ Hereafter, the operation and effect of the rotation angle detection circuit constructed as above will be explained in detail.

When a step motor is rotated to a predetermined angle by a control signal being inputted to the step motor, the control signal is converted into a TTL level and then it is inputted through the input terminals AI, BI, CI to input terminals IN1-IN3, $\overline{IN4}$-$\overline{IN6}$ of the monostable multivibrators MV1-MV3, MV4-MV6, thereby resulting in at least one of the monostable multivibrators MV1-MV6 outputting a high potential pulse signal.

For example, when a rotator of a step motor is rotated to an angle of +15° by having applied "011" under a state wherein "001" was previously applied thereto, the signals "011" are also applied to the input terminals CI, BI, AI and the input terminals IN1-IN3, $\overline{IN4}$-$\overline{IN6}$ of the monostable multivibrators MV1-MV3, MV4-MV6, respectively, so that a high level pulse signal is outputted from the monostable multivibrator MV2 and inputted to a NOR gate NOR1. Accordingly, a low potential pulse signal is outputting from the NOR gate NOR1 and inputted to an AND gate AND1 so that a low potential pulse signal is outputted from the AND gate AND1.

And, in the case where a rotator of a step motor is rotated to an angle of 30° by having applied "010" to the state where the signals of "001" were applied thereto, the signals of "010" are inputted to the monostable multivibrators MV1-MV3, MV4-MV6 via the input terminals CI, BI, AI, so that a high potential signal is outputted from the monostable multivibrators MV2, MV6 and inputted to the NOR gates NOR1, NOR2, respectively. Accordingly, a low potential pulse signal is outputted from the NOR gates NOR1, NOR2 and inputted to the AND gate; then a low potential pulse signal is outputted from the AND gate AND1. In this way, as step motor rotates at the angles of +15° and +30°, a pulse signal is outputted from the AND gate AND1, and the pulse signal is inputted to clock terminals CK1-CK3 of the flip-flops FF1-FF3 and a clock terminal CP1 of the counter CO1, and to one input terminal of an OR gate OR1, respectively. Accordingly, the rotator is rotated to a predetermined angle by the signal being inputted to the step motor, and when pulse signals are applied to the clock terminals CK1-CK3 of the flip-flops FF1-FF3, the pulse signals are applied to the input terminals A1, B1, C1 of the programmable array logic circuit PAL via the output terminals Q1-Q3 of the flip-flops FF1-FF3, respectively. At this moment, at the input terminals A2, B2, C2 of the programmable array logic circuit PAL the signals which are being inputted to the input terminals AI, BI, CI, are input, respectively. As a result, the programmable array logic circuit PAL outputs an up/down direction control signal UP/DO and a mask control signal MS in response to the signals which are being input to its input terminals A1, B1, C1; A2, B2, C2, That is to say, the programmable array logic circuit PAL outputs a high and low potential up/down control signal UP/$\overline{D0}$ in accordance with the positive and negative rotation of the step motor as shown in the truth table of FIG. 5, and inputs them to the up/down terminals U1/$\overline{D1}$, U2/$\overline{D2}$ of the counters CO1, CO2, and at the same time, outputs high and low potential mask control signals MS according to the rotation of step motor at the angles of 15° and 30°, and inputs them to the other side input terminal of an OR gate OR1. Accordingly, in the case where the step motor is rotated to an angle of +15° or −15°, the counter CO1 upcounts or downcounts the pulse signal being inputted to its clock terminal CP1, and on the other hand, in the case where the rotator of the step motor is rotated to an angle of +30° or −30°, the counters CO1, CO2, upcount or downcount the pulse signals being input to their clock terminals CP1, CP2. Then the signals upcounted or downcounted at the counters CO1, CO2 as above are added at an adder ADD and outputted as angle signals T0-T5 of the rotator of the step motor being rotated.

For example, under the state when the signals "001" are applied to the input terminals of the step motor, when the rotator of the step motor is rotated to an angle of +15° by applying the signals "011", the signals "011", "001" are applied to input terminals C2, B2, A2; C1, B1, A1 of the programmable array logic circuit PAL, respectively.

As a result, a high potential mask control signal MS is outputted from the programmable array logic circuit PAL as shown in the truth table of FIG. 5, and applied to the other side input terminal of the OR gate OR1, so that the high potential signal is continuously outputted from the OR gate OR1 regardless of the signal being inputted to its one side input terminal and applied to a clock terminal CP2 of the counter CO2. That is to say, even though a low potential pulse signal is outputted from the AND gate AND1 at this time, a high potential signal is continuously outputted from the OR gate OR1 and applied to the clock terminal CP2 of the counter CO2. Furthermore, since a high potential up/down direction control signal UP/$\overline{D0}$ is outputted from the programmable array logic circuit PAL and applied to the up/down terminals U1/$\overline{D1}$, U2/$\overline{D2}$ of the counters CO1, CO2, the counters CO1, CO2 perform the upcount operation. Therefore, the counter CO1 upcounts a low potential pulse signal which is outputted from the AND gate AND1 of the signal combinational circuit 11. However, since the low potential pulse signal, which is output from the AND gate AND1 of the signal combinational circuit 11, is not applied to the clock terminal CP2 of the counter CO2 as described above, the counter CO2 does not count.

On the other hand, when the rotator of the step motor is rotated to an angle of +30° by applying the signals "010" under the state where the signals "001" are applied to the input terminals of the step motor, the signals "010", "001" are applied to the input terminals C2, B2, A2; C1, B1, A1 of the programmable array logic circuit PAL, respectively, and accordingly a low potential mask control signal MS is outputted from the programmable array logic circuit PAL and applied to the other side input terminal of the OR gate OR1. The low potential pulse signal, which is outputted from the AND gate AND1 of the signal combinational circuit 11, is applied to the clock terminal CP2 of the counter CO2 through the OR gate OR1. And, at this moment since a high potential up/down direction control signal UP/$\overline{D0}$ is outputted from the programmable array logic circuit PAL and applied to the up/down terminals U1/$\overline{D1}$, U2/$\overline{D2}$ of the counters CO1, CO2, the counters CO1, CO2 perform an upcount operation. Therefore, the counters CO1, CO2 upcount; at this moment, the low potential pulse signal is outputted from the AND gate AND1 of the signal combinational circuit 11.

The values counted at the counters CO1, CO2 are added by an adder ADD and outputted as angle signals T0–T5 according to the rotation of the step motor. That is to say, as the step motor rotates to an angle of +15° or −15°, the output signal of the adder ADD is increased or decreased by "1", and as the step motor rotates to an angle of +30° or −30° the output signal of the adder ADD is increased or decreased by "2".

When "24" is outputted from the adder ADD by the rotation of the rotator of the step motor to an angle of 360°, that is, the angle signals T5–T0, which are outputted from the adder ADD, become "011000", high potential signals are outputted from the exclusive OR gate EXOR1 of the reset circuit 13 and the NOR gate NOR3, and all the high potential signals are applied to the input terminal of the NAND gate NAND1, a low potential signal is outputted from the NAND gate NAND1 and the low potential signal is applied to the reset terminals $\overline{RST1}$, $\overline{RST2}$ of the counters CO1, CO2 to reset the counters CO1, CO2.

As described hereinabove in detail, the rotation angle detection circuit for a step motor according to the present invention makes it possible to correctly detect the rotation of the step motor. It is thereby useful for application in a system which electrically measures the rotation of the step motor.

What is claimed is:

1. A rotation detection circuit having input pulse signals for a step motor, comprising:
    (a) monostable means coupled with input pulse signals for outputting edge signals at the leading edge and the trailing edge of said input pulse signals;
    (b) switch control means coupled with input pulse signals and outputted edge signals for outputting combination signals;
    (c) a logic circuit means coupled with the output combination signals of said switch control and input pulse signals for outputting
    a direction control signal for determining the positive and negative rotation direction of the step motor, and
    a mask control signal for discriminating the rotation angles of the step motor; and
    (d) a counting circuit for outputting rotation angle signals by counting the input pulse signals of the monostable means upon the control of the mask control signal and direction control signal of said logic circuit means.

2. Apparatus of claim 1 further including,
    a reset circuit for resetting said counting circuit when the rotation angle signals are the signals of the rotation of the step motor at an angle of 360°.

3. A rotation detection circuit having input pulse signals for a step motor, comprising:
    (a) monostable multivibrators having said input pulse signals coupled thereto for outputting edge signals at the leading edge and the trailing edge of said input pulse signals;
    (b) a signal combinational circuit for outputting a low potential pulse signal when a said edge signal is output from at least one of said monostable multivibrators;
    (c) flip-flops coupled with said input pulse signals and said low potential pulse signal for outputting a switch signal;
    (d) a programmable array logic part having said switch signals of said flip-flops and said input pulse signals coupled thereto for outputting
    an up/down control signal for determining the positive and negative rotation direction of the step motor, and
    a mask control signal for discriminating the rotation angles of 15°, 30°, of the step motor;
    (e) a counting circuit for outputting rotation angle signals by up/down counting the low potential signal of the signal combinational circuit to "1" or "2" upon the control of the mask control signal and up/down control signal of said programmable array logic part; and
    (f) a reset circuit for resetting said counting circuit when the rotation angle signals are the signals of the rotation of the step motor at an angle of 360°.

* * * * *